US012568454B2

(12) United States Patent (10) Patent No.: US 12,568,454 B2
Li et al. (45) Date of Patent: Mar. 3, 2026

(54) SCALING FACTOR DESIGN FOR LAYER 1 REFERENCE SIGNAL RECEIVED POWER (L1-RSRP) MEASUREMENT PERIOD

(71) Applicant: Intel Corporation, Santa Clara, CA (US)

(72) Inventors: Hua Li, Santa Clara, CA (US); Meng Zhang, Beijing (CN); Rui Huang, Santa Clara, CA (US); Andrey Chervyakov, Kildare (IE); In-Seok Hwang, Santa Clara, CA (US); Richard Burbidge, Shrivenham (GB); Ilya Bolotin, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 306 days.

(21) Appl. No.: 18/558,470

(22) PCT Filed: Jan. 17, 2023

(86) PCT No.: PCT/US2023/010931
§ 371 (c)(1),
(2) Date: Nov. 1, 2023

(87) PCT Pub. No.: WO2023/141096
PCT Pub. Date: Jul. 27, 2023

(65) Prior Publication Data
US 2024/0251366 A1 Jul. 25, 2024
Related U.S. Application Data

(60) Provisional application No. 63/301,424, filed on Jan. 20, 2022, provisional application No. 63/395,611, filed on Aug. 5, 2022.

(51) Int. Cl.
*H04J 3/06* (2006.01)
*H04B 17/318* (2015.01)
(Continued)

(52) U.S. Cl.
CPC ...... *H04W 56/0015* (2013.01); *H04B 17/328* (2023.05); *H04W 24/10* (2013.01)

(58) Field of Classification Search
CPC . H04W 56/0015; H04W 24/10; H04W 24/08; H04B 17/328; H04L 5/005;
(Continued)

(56) References Cited

U.S. PATENT DOCUMENTS 11,128,511 B2 * 9/2021 Yokomakura ......... H04L 5/0078
11,917,564 B2 * 2/2024 Vikram ................. H04W 24/02
(Continued)

FOREIGN PATENT DOCUMENTS

WO 2020/069268 A1 4/2020

OTHER PUBLICATIONS

International Patent Office—International Search Report and Written Opinion mailed May 1, 2023, from International Patent Application No. PCT/US2023/010931, 9 pages.
(Continued)

*Primary Examiner* — Phuongchau Ba Nguyen
(74) *Attorney, Agent, or Firm* — Gray Ice Higdon, PLLC

(57) ABSTRACT

Various embodiments herein provide techniques related to a user equipment (UE). In embodiments, the UE may identify a received transmission from a serving cell or another cell (CDP) that has a different physical cell identifier (PCI) than the serving cell. The UE may identify, based on a sharing factor related to the serving cell and a sharing factor related to the CDP, an updated sharing factor. The UE may perform, based on the updated sharing factor, a measurement related to the transmission. Other embodiments may be described and/or claimed.

20 Claims, 6 Drawing Sheets

(51) Int. Cl.
  *H04W 24/10*   (2009.01)
  *H04W 56/00*   (2009.01)

(58) Field of Classification Search
  CPC ...... H04L 5/0094; H04L 5/001; H04J 3/0685;
     H04J 3/0664; H04J 3/0632; H04J 3/0688;
              H04N 21/4305
  See application file for complete search history.

(56)      References Cited

U.S. PATENT DOCUMENTS

| | | |
|---|---|---|
| 2021/0014752 A1 | 1/2021 | Axmon et al. |
| 2021/0321279 A1 | 10/2021 | Yang et al. |
| 2023/0354458 A1* | 11/2023 | Abedini ............ H04W 56/0015 |
| 2024/0049016 A1* | 2/2024 | Lei ........................ H04W 16/14 |
| 2024/0056948 A1* | 2/2024 | Wu ........................ H04W 72/23 |
| 2025/0097869 A1* | 3/2025 | Jeon ...................... H04W 76/28 |
| 2025/0267598 A1* | 8/2025 | Ly ........................... H04L 5/005 |

OTHER PUBLICATIONS

RAN1, RAN4, RAN2, "LS on L1-RSRP measurement behaviour when SSBs associated with different PCIs overlap," 3GPP TSG-RAN WG4 Meeting #101-bis-e, R4-2200040, Jan. 17-Jan. 25, 2022, Online Meeting, 3 pages.

Samsung, "Moderator summary#2 for multi-beam enhancement: Round 1," 3GPP TSG RAN WG1 #106bis-e, R1-2110492, Agenda item: 8.1.1, Oct. 11-19, 2021, e-Meeting, 36 pages.

* cited by examiner

SCALING FACTOR DESIGN FOR LAYER 1 REFERENCE SIGNAL RECEIVED POWER (L1-RSRP) MEASUREMENT PERIOD

CROSS REFERENCE TO RELATED APPLICATION

The present application is a national phase entry under 35 U.S.C. § 371 of International Application No. PCT/US2023/010931, filed Jan. 17, 2023, entitled "SCALING FACTOR DESIGN FOR LAYER 1 REFERENCE SIGNAL RECEIVED POWER (L1-RSRP) MEASUREMENT PERIOD," which claims priority to U.S. Provisional Patent Application No. 63/301,424, which was filed Jan. 20, 2022; and to U.S. Provisional Patent Application No. 63/395,611, which was filed Aug. 5, 2022, the entire disclosures of which are hereby incorporated by reference.

FIELD

Various embodiments generally may relate to the field of wireless communications. For example, some embodiments may relate to layer-1 reference signal received power (L1-RSRP) measurement.

BACKGROUND

Various embodiments generally may relate to the field of wireless communications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
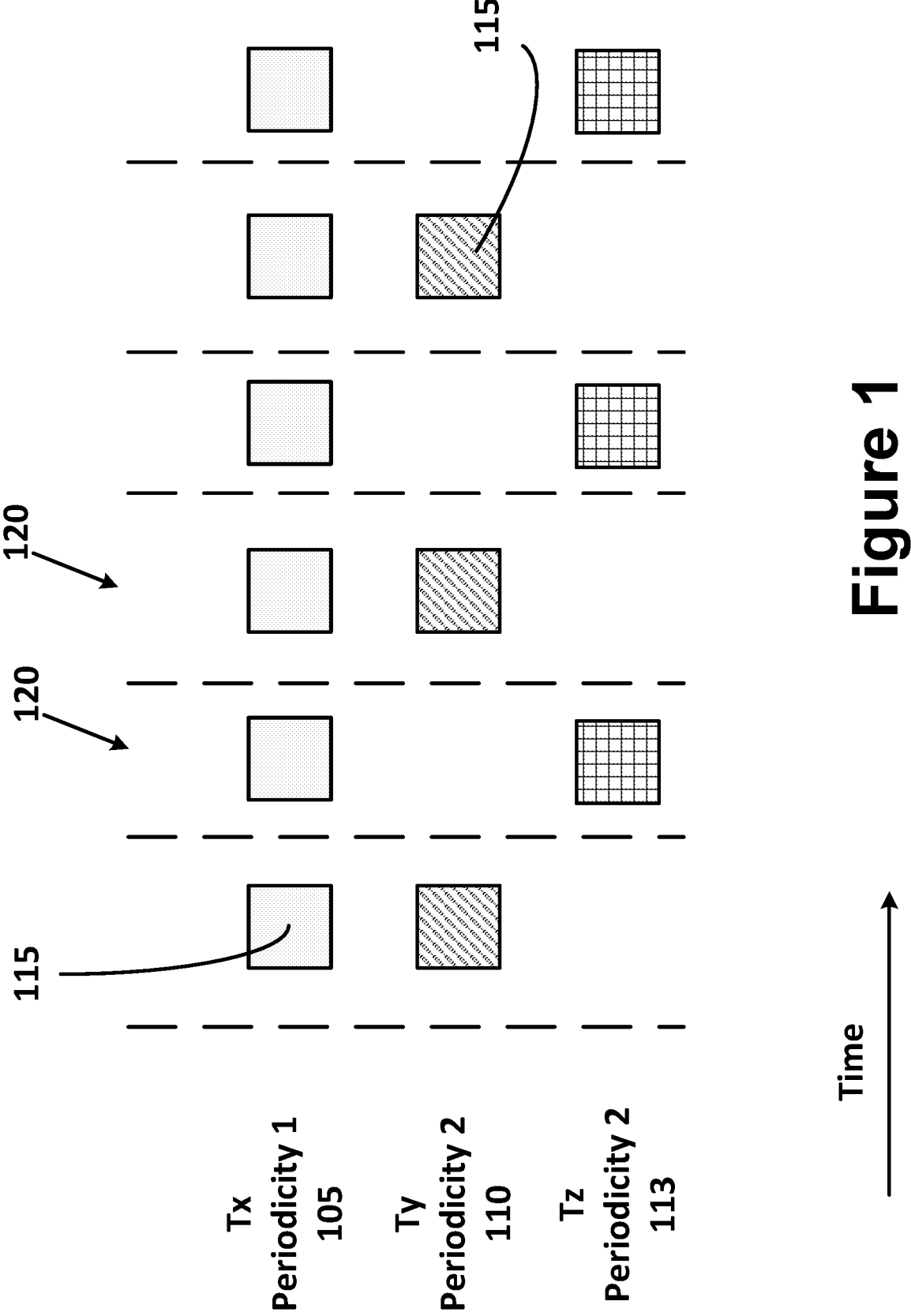
FIG. 1 depicts an example of the one element being partially overlapped with another, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Sharing and Scaling Factors:

Aspects of the sharing factor between a serving cell and a cell with different physical cell identifiers (PCIs) for Layer 1 reference signal received power (L1-RSRP) measurement may be defined in legacy third generation partnership project (3GPP) specifications. However, some use cases may be problematic. Therefore, an alternative scaling factor design may be desirable for use with L1-RSRP measurement. Embodiments herein relate to scaling factor design method for L1-RSRP measurement for cells with different PCIs.

As used herein, the terms "sharing factor" and "scaling factor" may be used to describe various embodiments. Generally, sharing may be a concept that is due to the behavior of a SSB measurement, as described herein. If a SSB is overlapped, then the overlapped SSB may be used for a serving cell for some occasions, and another cell for other occasions. Then, scaling may be applied to the parameter P as described below. Generally, the two terms may be used interchangeably herein.

In legacy specifications, the scaling factor of P is used for L1-RSRP measurement for a serving cell. Synchronization signal block (SSB) resources for L1-RSRP measurement may collide with SSB-based measurement timing configuration (SMTC) and measurement gap, and so various scaling factors may be described for different colliding scenarios in section 9.5.4.1 of the 3GPP technical specification (TS).

In the 3GPP Release-17 (Rel-17) specifications, the scaling factor of P may be updated for L1-RSRP measurement for both a serving cell and a cell with a different PCI because the SSB resource(s) between the serving cell and the cell with different a PCI (CDP) may collide with each other. At the same time, the SSB resource(s) from the two cells may collide with a SMTC and a measurement gap respectively (e.g., in one example the SSB resource from the serving cell may collide with a SMTC, and the SSB resource of the CDP may collide with a measurement gap). There are several scenarios for scaling factor design, which may increase the complexity of such design. Therefore, it may be desirable to design a unified method to calculate the scaling factor for different scenarios.

Various terms may be used herein to describe various equations and calculations related to the scaling factor. As used herein, the following may be used:

$T_{SSB}$=ssb-periodicityServingCell, e.g., the SSB periodicity of the serving cell $T_{SMTCperiod}$=the configured SMTC period $T_{SSB\_CDP}$=SSB periodicity of the CDP $P_{SC}$=sharing factor of serving cell when L1-RSRP is only performed for serving cell $P_{CDP}$=sharing factor of CDP when L1-RSRP is only performed for CDP $P_{final,\ CDP}$=sharing factor of CDP when L1-RSRP is performed on both serving cell and cell with different PCI.

$P_{final,\ SC}$=sharing factor of serving cell when L1-RSRP is performed on both serving cell and CDP.

xRP=periodicity of MG.

Further, with respect to concepts described in further detail below, FIG. 1 depicts an example of the one element (e.g., SSB) being partially overlapped with another (e.g., an SMTC occasion). It will be understood that FIG. 1 is intended as a very generalized and high level Figure for the sake of description of this concept. Specifically, FIG. 1 shows three transmissions, Tx 105, Ty 110, and Tz 113. Tx 105 has a periodicity of 1, and Ty 110 and Tz both have a periodicity of 2. Each element 115 of the transmissions may or may not be transmitted in a transmission occasion 120. As can be seen in FIG. 1, an element 115 of Tx 105 is transmitted in every occasion 120 (because it has a periodicity of 1), and an element 115 of Ty 110 is transmitted in every other occasion 120 (because it has a periodicity of 2). As such, it may be said that Tx 105 partially overlaps with Ty 110. Similarly, Tx 105 partially overlaps with Tz 113. It will be further noted that Ty 110 and Tz 113 are transmitted in separate transmission occasions 120, and so are said to be non-overlapping.

In embodiments, the scaling factor may be calculated based on the following two elements.

For the first element, the SSB resource for the serving cell and the SSB resource for the CDP may be compared with legacy scenarios to calculate $P_{SC}$ and $P_{CDP}$ respectively.

In one example, for frequency range 2 ("FR2," which may describe frequencies between approximately 24.25 Gigahertz (GHz) and approximately 52.6 GHz), the $P_{SC}$ for a serving cell may be calculated based on:

$$P_{SC} = \frac{1}{1 - \frac{T_{SSB}}{T_{SMTCperiod}}},$$

when the SSB of serving cell is partially overlapped with measurement gap ($T_{SSB}$<MGRP, where MGRP stands for the "measurement gap repetition period") and SSB is partially overlapped with SMTC occasion ($T_{SSB}$<$T_{SMTCperiod}$) and SMTC occasion is partially or fully overlapped with a measurement gap (which may be referred to below as "MG" or "GAP").

P=P$_{sharing\ factor}$, when SSB of serving cell is not overlapped with measurement gap and SSB is fully overlapped with SMTC period ($T_{SSB}$=$T_{SMTCperiod}$).

$$P_{SC} = \frac{1}{1 - \frac{T_{SSB}}{xRP} - \frac{T_{SSB}}{T_{SMTCperiod}}},$$

when SSB of serving cell is partially overlapped with GAP and SSB is partially overlapped with SMTC occasion ($T_{SSB}$<$T_{SMTCperiod}$) and SMTC occasion is not overlapped with GAP and $T_{SMTCperiod}$≠xRP or $T_{SMTCperiod}$=xRP and $T_{SSB}$<0.5*$T_{SMTCperiod}$.

$$P_{SC}\ \text{is}\ \frac{P_{sharing\ factor}}{1 - \frac{T_{SSB}}{xRP}},$$

when SSB of serving cell is partially overlapped with GAP and SSB is partially overlapped with SMTC occasion ($T_{SSB}$<$T_{SMTCperiod}$) and SMTC occasion is not overlapped with GAP and $T_{SMTCperiod}$=xRP and $T_{SSB}$=0.5*$T_{SMTCperiod}$

4

$$P_{SC} = \frac{P_{SC}}{1 - \frac{T_{SSB}}{T_{SMTCperiod}}},$$

when SSB of sterving cell is partially overlapped with GAP ($T_{SSB}$<xRP) and SSB is partially overlapped with SMTC occasion ($T_{SSB}$<$T_{SMTCperiod}$) and SMTC occasion is partially or fully overlapped with GAP.

In one example, for FR2, the $P_{CDP}$ for a CDP may be calculated based on:

$$P_{CDP} = \frac{1}{1 - \frac{T_{SSB\_CDP}}{T_{SMTCperiod}}},$$

when SSB of cell with different PCI is not overlapped with $T_{SMTCperiod}$ measurement gap and SSB of cell with different PCI is partially overlapped with SMTC occasion ($T_{SSB\_CDP}$<$T_{SMTCperiod}$).

$$P_{CDP} = \frac{1}{1 - \frac{T_{SSB\_CDP}}{MGRP} - \frac{T_{SSB\_CDP}}{T_{SMTCperiod}}},$$

when SSB of cell with different PCI is partially overlapped with measurement gap and SSB of cell with different PCI is partially overlapped with SMTC occasion ($T_{SSB\_CDP}$<$T_{SMTCperiod}$) and SMTC occasion is not overlapped with measurement gap and $T_{SMTCperiod}$≠MGRP or $T_{SMTCperiod}$=MGRP and $T_{SSB\_CDP}$<0.5*$T_{SMTCperiod}$ $$P_{CDP} = \frac{1}{1 - \frac{T_{SSB\_CDP}}{T_{SMTCperiod}}},$$

when SSB of cell with different PCI is partially overlapped with measurement gap ($T_{SSB\_CDP}$<MGRP) and SSB of cell with different PCI is partially overlapped with SMTC occasion ($T_{SSB\_CDP}$<$T_{SMTCperiod}$) and SMTC occasion is partially or fully overlapped with measurement gap.

With the calculated $P_{SC}$ and $P_{CDP}$, the new periodicity for serving cell and CDP may be derived as shown below:

$T_{SSB\_SC}$'=$P_{SC}$*$T_{SSB\_SC}$ $T_{SSB\_CDP}$'=$P_{CDP}$*$T_{SSB\_CDP}$

The new periodicities have removed the impact of SMTC and measurement gap, and may be compared directly to get the final scaling factor for the serving cell and the CDP as follows:

If $T_{SSB\_CDP}$<$T_{SSB\_SC}$':

$$P_{final,CDP} = P_{CDP} * \frac{1}{1 - \frac{T'_{SSB\_CDP}}{T'_{SSB\_SC}}}$$

$$P_{final,\,SC} = P_{SC}$$

If $T_{SSB\_SC}' < T_{SSB\_CDP}'$:

$$P_{final,\,CDP} = P_{CDP}$$

$$P_{final,SC} = P_{SC} * \dfrac{1}{1 - \dfrac{T_{SSB\_SC}'}{T_{SSB\_CDP}'}}$$

If $T_{SSB\_CDP}' = T_{SSB\_SC}'$, the remaining part may be shared between serving cell and cell with different PCI as follows:

$$P_{final,\,CDP} = P_{CDP} * 2$$

$$P_{final,\,SC} = P_{SC} * 2$$

L1-RSRP Measurement

For inter-cell transmission configuration indicator (TCI) indication, the target TCI may refer to a CDP. It is possible that synchronization signal block (SSB) configuration of the serving cell and the CDP are overlapped. It may be desirable to define L1-RSRP measurement requirements for this case.

Various embodiments in this section may provide measurement requirements for inter-cell beam indication where the SSB configuration for a serving cell and a CDP are overlapped.

In embodiments, SSBs associated with a CDP (e.g., a non-serving cell) may be used for neighbor cell L1-RSRP measurement. The SSB configuration for a non-serving cell may be provided by a higher layer to the UE. The SSB configuration may be the same or different for a serving cell measurement and a non-serving cell measurement. The SSBs may be fully overlapped, partially overlapped, or non-overlapped.

For Frequency Range 1 ("FR1," e.g. Frequencies of Less than Approximately 6 GHz)

Both SSBs inside or outside of the SMTC may be used for both the serving cell and the non-serving cell (e.g., the CDP) for L1-RSRP measurement. Because the beam received by the UE from both of these cells beam may be the same, the UE may be able to perform L1-RSRP for both the serving cell and the non-serving cell simultaneously.

FR2

For FR2, there may be two cases for SSB overlapping:

Case 1: SSB for Serving Cell and Non-Serving Cell are Fully Overlapped and Different Receive Beams are Used Similar to a layer-3 (L3) measurement, for the intra-frequency case, the SSB configuration for the serving cell and the non-serving cell may be the same. Therefore, the SSB may be fully overlapped for the serving cell and the non-serving cell. In this case, inside of the SMTC, because the L1 measurement may re-use the beam of the L3 measurement, the same receive beam may be used for both the serving cell and the non-serving cell. The UE may be able to perform L1-RSRP measurement for both serving cell and non-serving cell simultaneously. For SSBs outside of the SMTC, different receive beams can be considered for the serving cell and the non-serving cell to find a more suitable beam. The SSB for the serving cell measurement and the SSB for the non-serving cell measurement may only be shared, e.g. some SSBs may be used for the serving cell and some others may be used for the non-serving cell. L1-RSRP measurement may be performed in a sequential manner for the serving cell and the non-serving cell. Therefore, there may be a sharing factor for receive sweeping between the serving cell measurement and the non-serving cell measurement.

Case 2: SSB for Serving Cell and Non-Serving Cell are Partially Overlapped and Different RX Beam is Used In this case, some SSBs used for the serving cell may not be overlapped with SSBs for a non-serving cell. For SSBs that are not overlapped with the serving cell, the UE may perform L1-RSRP for the non-serving cell. For SSBs that are overlapped with the serving cell, a measurement restriction may be defined, e.g. UE is required to measure for the serving cell or the non-serving cell. It may not be required to perform measurement simultaneously for both the serving and the non-serving cells. A longer measurement period for SSB-based L1-RSRP measurement may be expected.

In another embodiment, the SSB can still be shared when SSBs are overlapped. For example, when SSBs are overlapped, some SSBs may be used for the serving cell and some others may be used for the non-serving cell.

Case 3: SSB for Serving Cell and Non-Serving Cell are Fully or Partially Overlapped and the Same Receive Beam is Used In this case, no matter whether the SSBs for the serving cell and the non-serving cell are fully or partially overlapped, the same receive beam may be used for the serving cell and the non-serving cell. Therefore, the UE may be able to measure the SSB for both cells simultaneously.

SYSTEMS AND IMPLEMENTATIONS

FIGS. 2-5 illustrate various systems, devices, and components that may implement aspects of disclosed embodiments.

Figure 2:
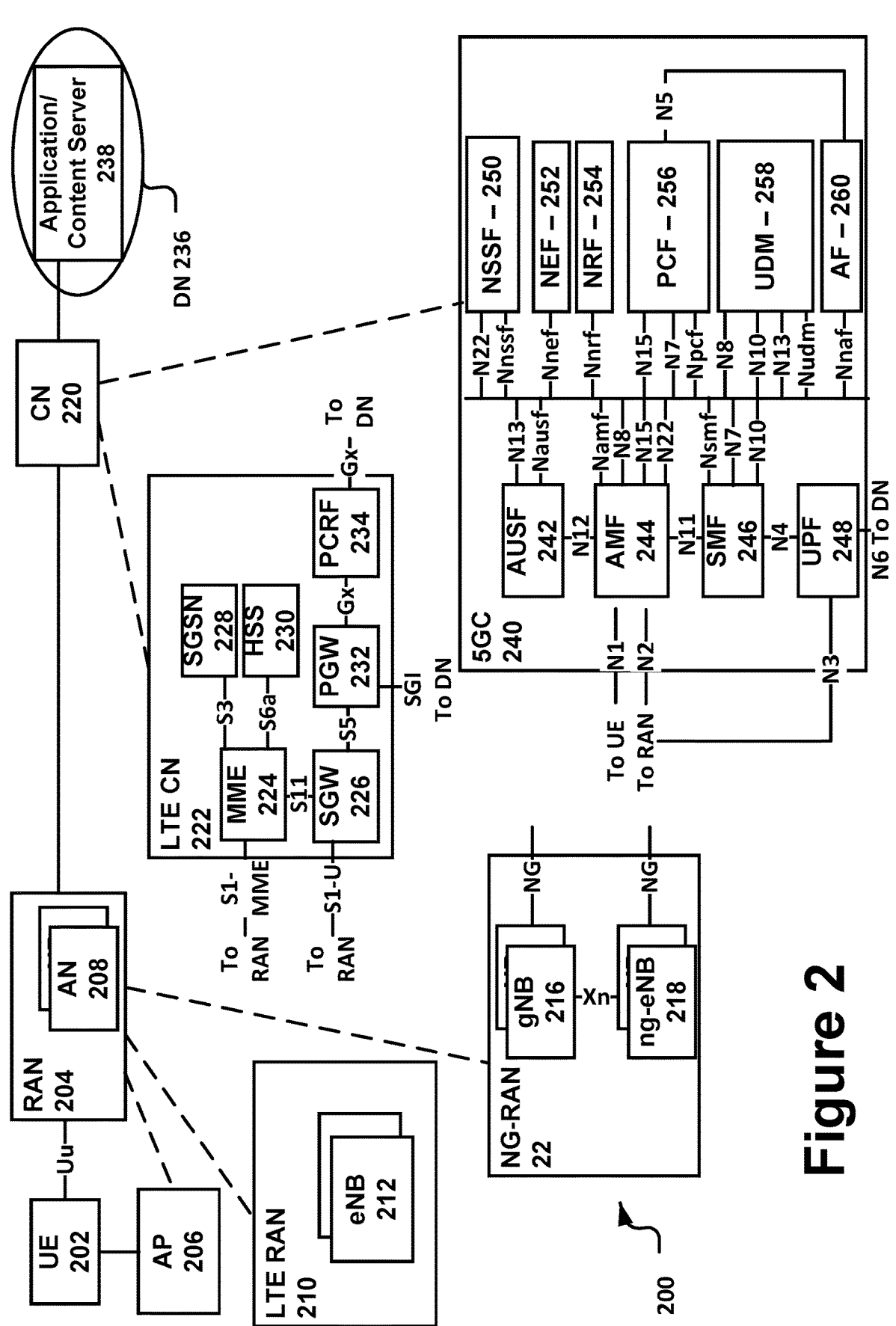
FIG. 2 schematically illustrates a wireless network in accordance with various embodiments.

FIG. 2 illustrates a network 200 in accordance with various embodiments. The network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be communicatively coupled with the RAN 204 by a Uu interface. The UE 202 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 200 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 being configured by the RAN 204 to utilize both cellular radio resources and WLAN resources.

The RAN 204 may include one or more access nodes, for example, AN 208. AN 208 may terminate air-interface protocols for the UE 202 by providing access stratum protocols including RRC, PDCP, RLC, MAC, and L1 protocols. In this manner, the AN 208 may enable data/voice connectivity between CN 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low power base station for providing femtocells, picocells or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 202 or AN 208 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface, but may connect with a UE via an LTE air interface. The gNB 216 and the ng-eNB 218 may connect with each other over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN 214 and an AMF 244 (e.g., N2 interface).

The NG-RAN 214 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amount of frequency resources (for example, PRBs) to support data transmission under different traffic loading scenarios. A BWP containing a smaller number of PRBs can be used for data transmission with small traffic load while allowing power saving at the UE 202 and in some cases at the gNB 216. A BWP containing a larger number of PRBs can be used for scenarios with higher traffic load.

The RAN 204 is communicatively coupled to CN 220 that includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be an LTE CN 222, which may also be referred to as an EPC. The LTE CN 222 may include MME 224, SGW 226, SGSN 228, HSS 230, PGW 232, and PCRF 234 coupled with one another over interfaces (or "reference points") as shown. Functions of the elements of the LTE CN 222 may be briefly introduced as follows.

The MME 224 may implement mobility management functions to track a current location of the UE 202 to facilitate paging, bearer activation/deactivation, handovers, gateway selection, authentication, etc.

The SGW 226 may terminate an S1 interface toward the RAN and route data packets between the RAN and the LTE CN 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track a location of the UE 202 and perform security functions and access control. In addition, the SGSN 228 may perform inter-EPC node signaling for mobility between different RAT networks; PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable transfer of subscription and authentication data for authenticating/authorizing user access to the LTE CN 220.

The PGW 232 may terminate an SGi interface toward a data network (DN) 236 that may include an application/content server 238. The PGW 232 may route data packets between the LTE CN 222 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 236 may be an operator external public, a private PDN, or an intra-operator packet data network, for example, for provision of IMS services. The PGW 232 may be coupled with a PCRF 234 via a Gx reference point.

The PCRF 234 is the policy and charging control element of the LTE CN 222. The PCRF 234 may be communicatively coupled to the app/content server 238 to determine appropriate QoS and charging parameters for service flows. The PCRF 232 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for authentication of UE 202 and handle authentication-related functionality. The AUSF 242 may facilitate a common authentication framework for various access types. In addition to communicating with other elements of the 5GC 240 over reference points as shown, the AUSF 242 may exhibit an Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling, and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to L1 system); termination of SM parts of NAS messages; downlink data notification; initiating AN specific SM information, sent via AMF 244 over N2 to AN 208; and determining SSC mode of a session. SM may refer to management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point of interconnect to data network 236, and a branching point to support multi-homed PDU session. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine allowed NSSAI and the mapping to the subscribed S-NS-SAIs, if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point; and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on exposed capabilities of other NFs. This information may be stored at the NEF 252 as structured data, or at a data storage NF using standardized interfaces. The stored information can then be re-exposed by the NEF 252 to other NFs and AFs, or used for other purposes such as analytics. Additionally, the NEF 252 may exhibit an Nnef service-based interface.

The NRF 254 may support service discovery functions, receive NF discovery requests from NF instances, and provide the information of the discovered NF instances to the NF instances. NRF 254 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 254 may exhibit the Nnrf service-based interface.

The PCF 256 may provide policy rules to control plane functions to enforce them, and may also support unified policy framework to govern network behavior. The PCF 256 may also implement a front end to access subscription information relevant for policy decisions in a UDR of the UDM 258. In addition to communicating with functions over reference points as shown, the PCF 256 exhibit an Npcf service-based interface.

The UDM 258 may handle subscription-related information to support the network entities' handling of communication sessions, and may store subscription data of UE 202. For example, subscription data may be communicated via an N8 reference point between the UDM 258 and the AMF 244. The UDM 258 may include two parts, an application front end and a UDR. The UDR may store subscription data and policy data for the UDM 258 and the PCF 256, and/or structured data for exposure and application data (including PFDs for application detection, application request information for multiple UEs 202) for the NEF 252. The Nudr service-based interface may be exhibited by the UDR 221 to allow the UDM 258, PCF 256, and NEF 252 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/$3^{rd}$ party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re)selection and traffic routing. Based on operator deployment, when AF 260 is considered to be a trusted entity, the network operator may permit AF 260 to interact directly with relevant NFs. Additionally, the AF 260 may exhibit an Naf service-based interface.

The data network 236 may represent various network operator services, Internet access, or third party services that may be provided by one or more servers including, for example, application/content server 238.

Figure 3:
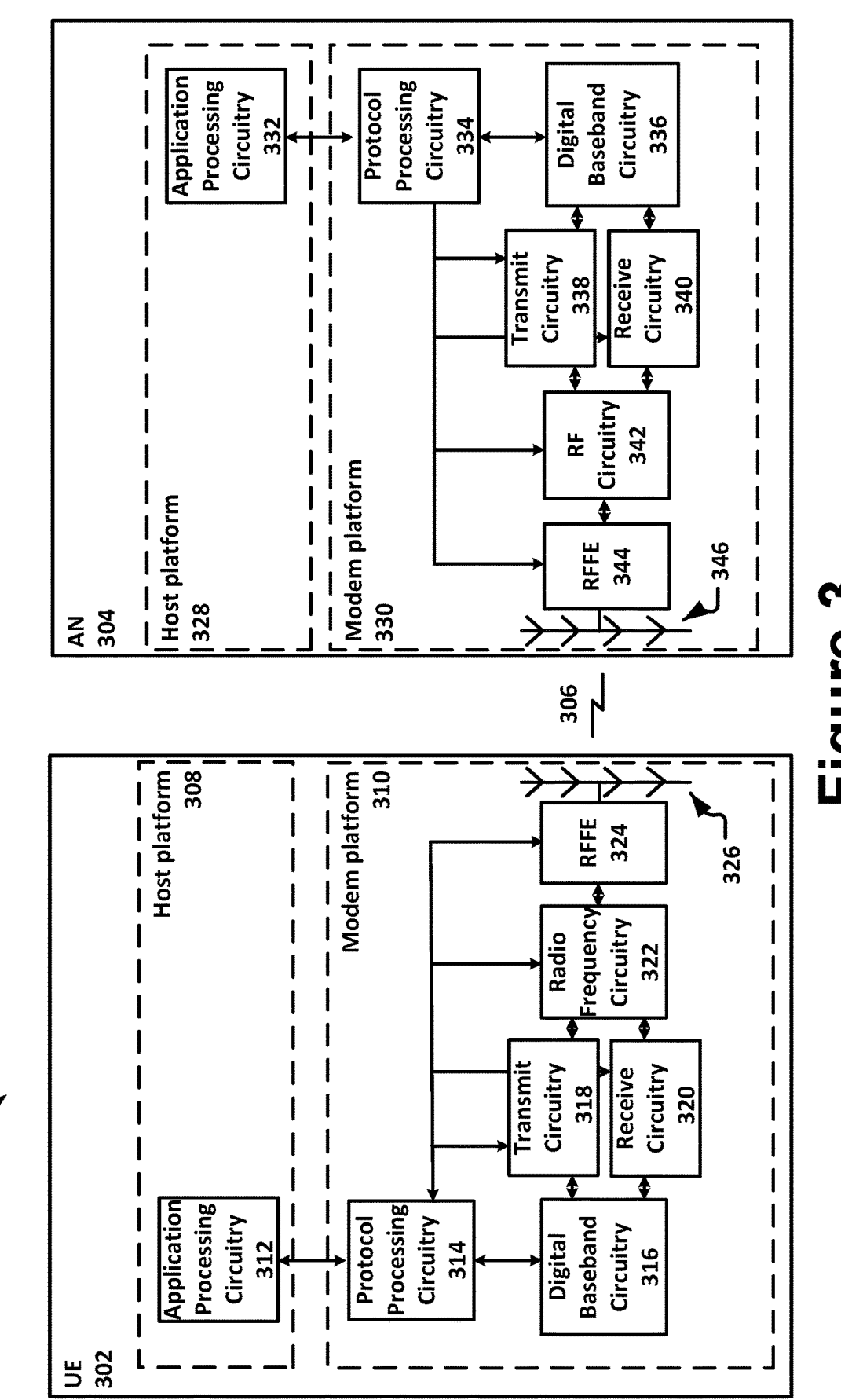
FIG. 3 schematically illustrates components of a wireless network in accordance with various embodiments.

FIG. 3 schematically illustrates a wireless network 300 in accordance with various embodiments. The wireless network 300 may include a UE 302 in wireless communication with an AN 304. The UE 302 and AN 304 may be similar to, and substantially interchangeable with, like-named components described elsewhere herein.

The UE 302 may be communicatively coupled with the AN 304 via connection 306. The connection 306 is illustrated as an air interface to enable communicative coupling, and can be consistent with cellular communications protocols such as an LTE protocol or a 5G NR protocol operating at mmWave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more of layer operations to facilitate transmission or reception of data over the connection 306. The layer operations implemented by the protocol processing circuitry 314 may include, for example, MAC, RLC, PDCP, RRC and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318, receive circuitry 320, RF circuitry 322, RFFE 324, and antenna panels 326 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 304 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with like-named components of the UE 302. In addition to performing data transmission/reception as described above, the components of the AN 308 may perform various logical functions that include, for example, RNC functions such as radio bearer management, uplink and downlink dynamic radio resource management, and data packet scheduling.

Figure 4:
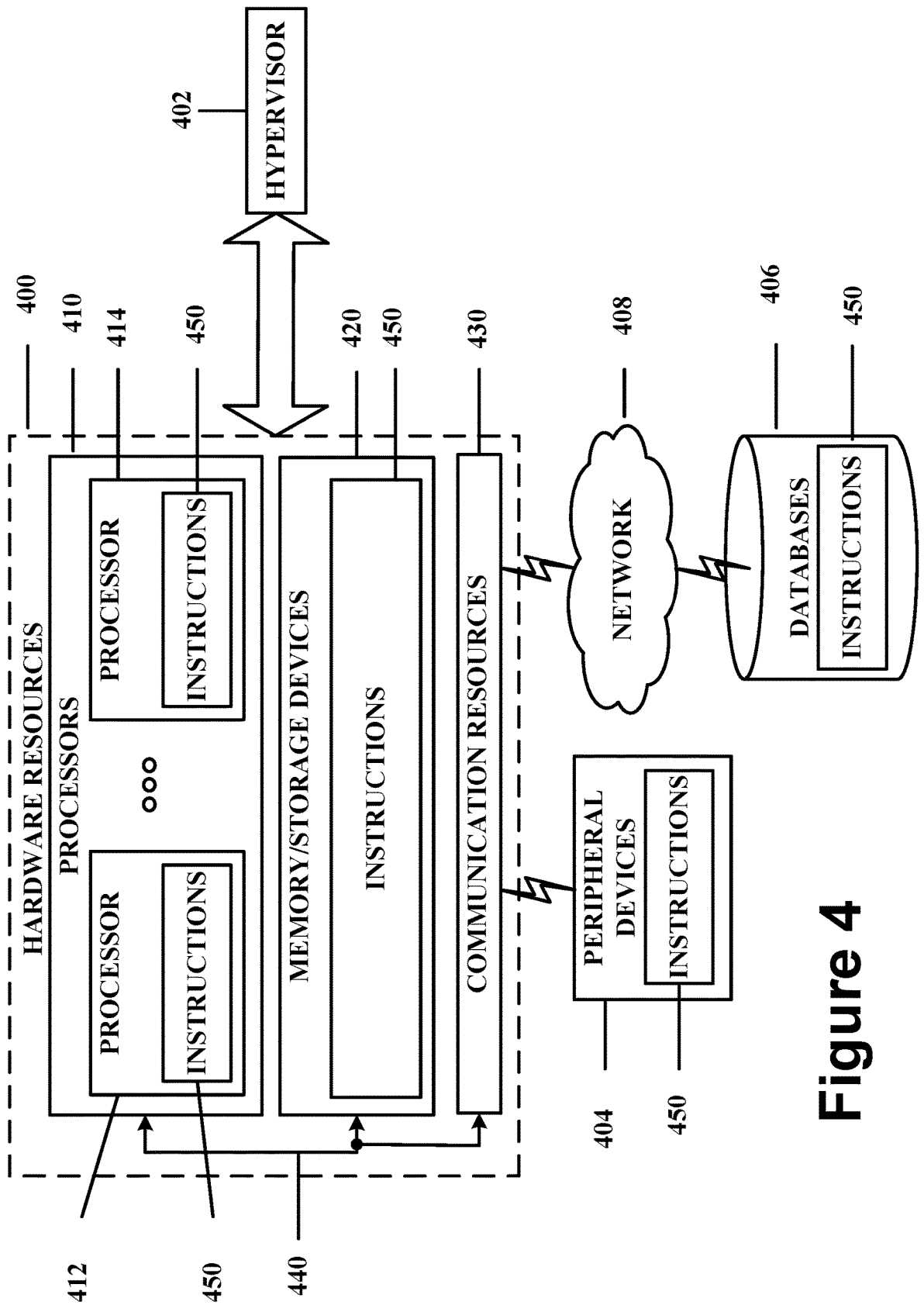
FIG. 4 is a block diagram illustrating components, according to some example embodiments, able to read instructions from a machine-readable or computer-readable medium (e.g., a non-transitory machine-readable storage medium) and perform any one or more of the methodologies discussed herein.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/sub-slices to utilize the hardware resources 400.

The processors 410 may include, for example, a processor 412 and a processor 414. The processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include main memory, disk storage, or any suitable combination thereof. The memory/storage devices 420 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

Figure 5:
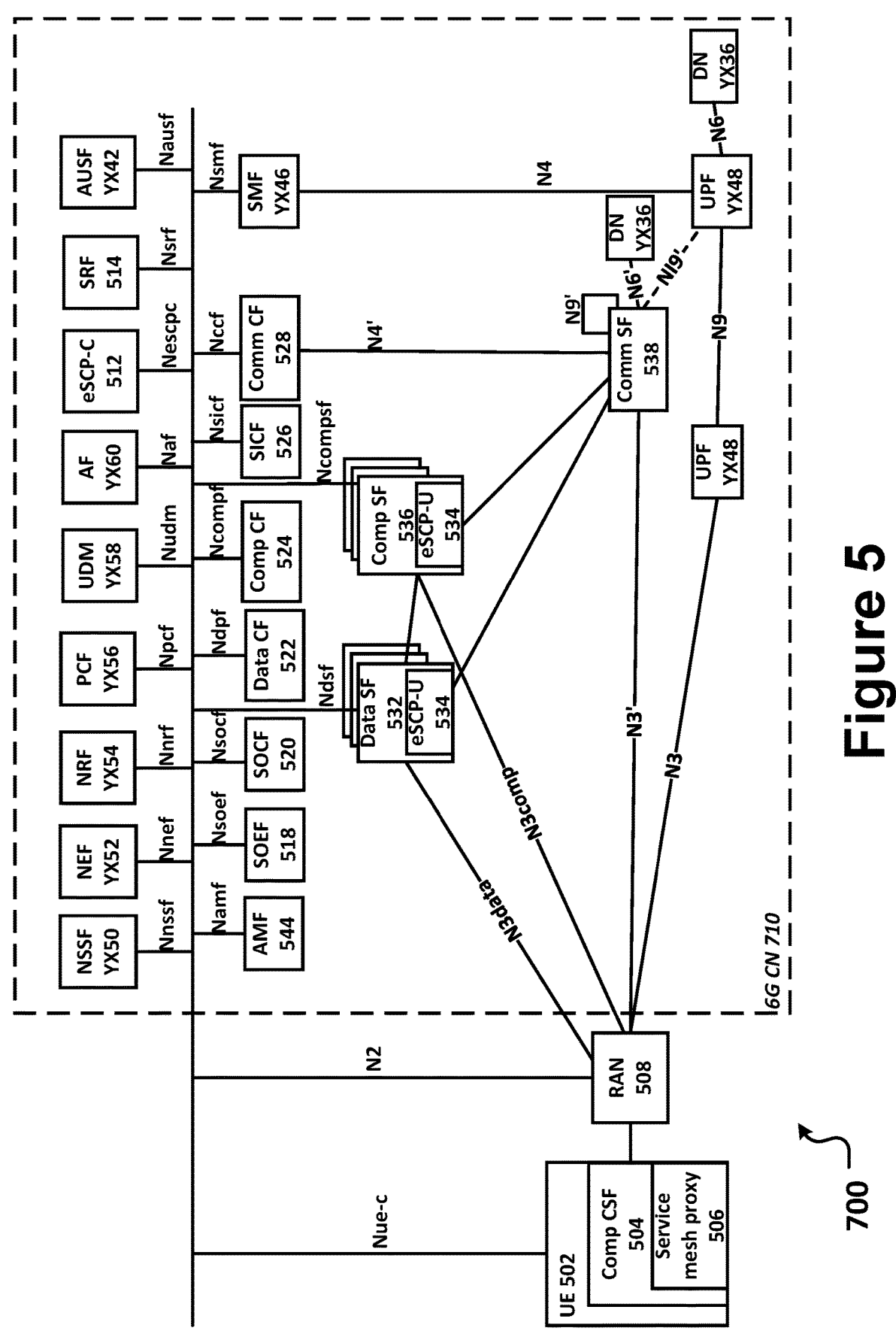
FIG. 5 illustrates a network 500 in accordance with various embodiments.

FIG. 5 illustrates a network 500 in accordance with various embodiments. The network 500 may operate in a matter consistent with 3GPP technical specifications or technical reports for 6G systems. In some embodiments, the network 500 may operate concurrently with network 200.

For example, in some embodiments, the network 500 may share one or more frequency or bandwidth resources with network 200. As one specific example, a UE (e.g., UE 502) may be configured to operate in both network 500 and network 200. Such configuration may be based on a UE including circuitry configured for communication with frequency and bandwidth resources of both networks 200 and 500. In general, several elements of network 500 may share one or more characteristics with elements of network 200. For the sake of brevity and clarity, such elements may not be repeated in the description of network 500.

The network 500 may include a UE 502, which may include any mobile or non-mobile computing device designed to communicate with a RAN 508 via an over-the-air connection. The UE 502 may be similar to, for example, UE 202. The UE 502 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

Although not specifically shown in FIG. 5, in some embodiments the network 500 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc. Similarly, although not specifically shown in FIG. 5, the UE 502 may be communicatively coupled with an AP such as AP 206 as described with respect to FIG. 2. Additionally, although not specifically shown in FIG. 5, in some embodiments the RAN 508 may include one or more ANss such as AN 208 as described with respect to FIG. 2. The RAN 508 and/or the AN of the RAN 508 may be referred to as a base station (BS), a RAN node, or using some other term or name.

The UE 502 and the RAN 508 may be configured to communicate via an air interface that may be referred to as a sixth generation (6G) air interface. The 6G air interface may include one or more features such as communication in a terahertz (THz) or sub-THz bandwidth, or joint communication and sensing. As used herein, the term "joint communication and sensing" may refer to a system that allows for wireless communication as well as radar-based sensing via various types of multiplexing. As used herein, THz or sub-THz bandwidths may refer to communication in the 80 GHz and above frequency ranges. Such frequency ranges may additionally or alternatively be referred to as "millimeter wave" or "mmWave" frequency ranges.

The RAN 508 may allow for communication between the UE 502 and a 6G core network (CN) 510. Specifically, the RAN 508 may facilitate the transmission and reception of data between the UE 502 and the 6G CN 510. The 6G CN 510 may include various functions such as NSSF 250, NEF 252, NRF 254, PCF 256, UDM 258, AF 260, SMF 246, and AUSF 242. The 6G CN 510 may additional include UPF 248 and DN 236 as shown in FIG. 5.

Additionally, the RAN 508 may include various additional functions that are in addition to, or alternative to, functions of a legacy cellular network such as a 4G or 5G network. Two such functions may include a Compute Control Function (Comp CF) 524 and a Compute Service Function (Comp SF) 536. The Comp CF 524 and the Comp SF 536 may be parts or functions of the Computing Service Plane. Comp CF 524 may be a control plane function that provides functionalities such as management of the Comp SF 536, computing task context generation and management (e.g., create, read, modify, delete), interaction with the underlaying computing infrastructure for computing resource management, etc. Comp SF 536 may be a user plane function that serves as the gateway to interface computing service users (such as UE 502) and computing nodes behind a Comp SF instance. Some functionalities of the Comp SF 536 may include: parse computing service data received from users to compute tasks executable by computing nodes; hold service mesh ingress gateway or service API gateway; service and charging policies enforcement; performance monitoring and telemetry collection, etc. In some embodiments, a Comp SF 536 instance may serve as the user plane gateway for a cluster of computing nodes. A Comp CF 524 instance may control one or more Comp SF 536 instances.

Two other such functions may include a Communication Control Function (Comm CF) 528 and a Communication Service Function (Comm SF) 538, which may be parts of the Communication Service Plane. The Comm CF 528 may be the control plane function for managing the Comm SF 538, communication sessions creation/configuration/releasing, and managing communication session context. The Comm SF 538 may be a user plane function for data transport. Comm CF 528 and Comm SF 538 may be considered as upgrades of SMF 246 and UPF 248, which were described with respect to a 5G system in FIG. 2. The upgrades provided by the Comm CF 528 and the Comm SF 538 may enable service-aware transport. For legacy (e.g., 4G or 5G) data transport, SMF 246 and UPF 248 may still be used.

Two other such functions may include a Data Control Function (Data CF) 522 and Data Service Function (Data SF) 532 may be parts of the Data Service Plane. Data CF 522 may be a control plane function and provides functionalities such as Data SF 532 management, Data service creation/configuration/releasing, Data service context management, etc. Data SF 532 may be a user plane function and serve as the gateway between data service users (such as UE 502 and the various functions of the 6G CN 510) and data service endpoints behind the gateway. Specific functionalities may include include: parse data service user data and forward to corresponding data service endpoints, generate charging data, report data service status.

Another such function may be the Service Orchestration and Chaining Function (SOCF) 520, which may discover, orchestrate and chain up communication/computing/data services provided by functions in the network. Upon receiving service requests from users, SOCF 520 may interact with one or more of Comp CF 524, Comm CF 528, and Data CF 522 to identify Comp SF 536, Comm SF 538, and Data SF 532 instances, configure service resources, and generate the service chain, which could contain multiple Comp SF 536, Comm SF 538, and Data SF 532 instances and their associated computing endpoints. Workload processing and data movement may then be conducted within the generated service chain. The SOCF 520 may also responsible for maintaining, updating, and releasing a created service chain.

Another such function may be the service registration function (SRF) 514, which may act as a registry for system services provided in the user plane such as services provided by service endpoints behind Comp SF 536 and Data SF 532 gateways and services provided by the UE 502.

The SRF 514 may be considered a counterpart of NRF 254, which may act as the registry for network functions.

Other such functions may include an evolved service communication proxy (eSCP) and service infrastructure control function (SICF) 526, which may provide service communication infrastructure for control plane services and user plane services. The eSCP may be related to the service communication proxy (SCP) of 5G with user plane service communication proxy capabilities being added. The eSCP is therefore expressed in two parts: eCSP-C 512 and eSCP-U 534, for control plane service communication proxy and user plane service communication proxy, respectively. The SICF 526 may control and configure eCSP instances in terms of service traffic routing policies, access rules, load balancing configurations, performance monitoring, etc.

Another such function is the AMF 544. The AMF 544 may be similar to 244, but with additional functionality. Specifically, the AMF 544 may include potential functional repartition, such as move the message forwarding functionality from the AMF 544 to the RAN 508.

Another such function is the service orchestration exposure function (SOEF) 518. The SOEF may be configured to expose service orchestration and chaining services to external users such as applications.

The UE 502 may include an additional function that is referred to as a computing client service function (comp CSF) 504. The comp CSF 504 may have both the control plane functionalities and user plane functionalities, and may interact with corresponding network side functions such as SOCF 520, Comp CF 524, Comp SF 536, Data CF 522, and/or Data SF 532 for service discovery, request/response, compute task workload exchange, etc. The Comp CSF 504 may also work with network side functions to decide on whether a computing task should be run on the UE 502, the RAN 508, and/or an element of the 6G CN 510.

The UE 502 and/or the Comp CSF 504 may include a service mesh proxy 506. The service mesh proxy 506 may act as a proxy for service-to-service communication in the user plane.

Capabilities of the service mesh proxy 506 may include one or more of addressing, security, load balancing, etc.

Example Procedures

Figure 6:
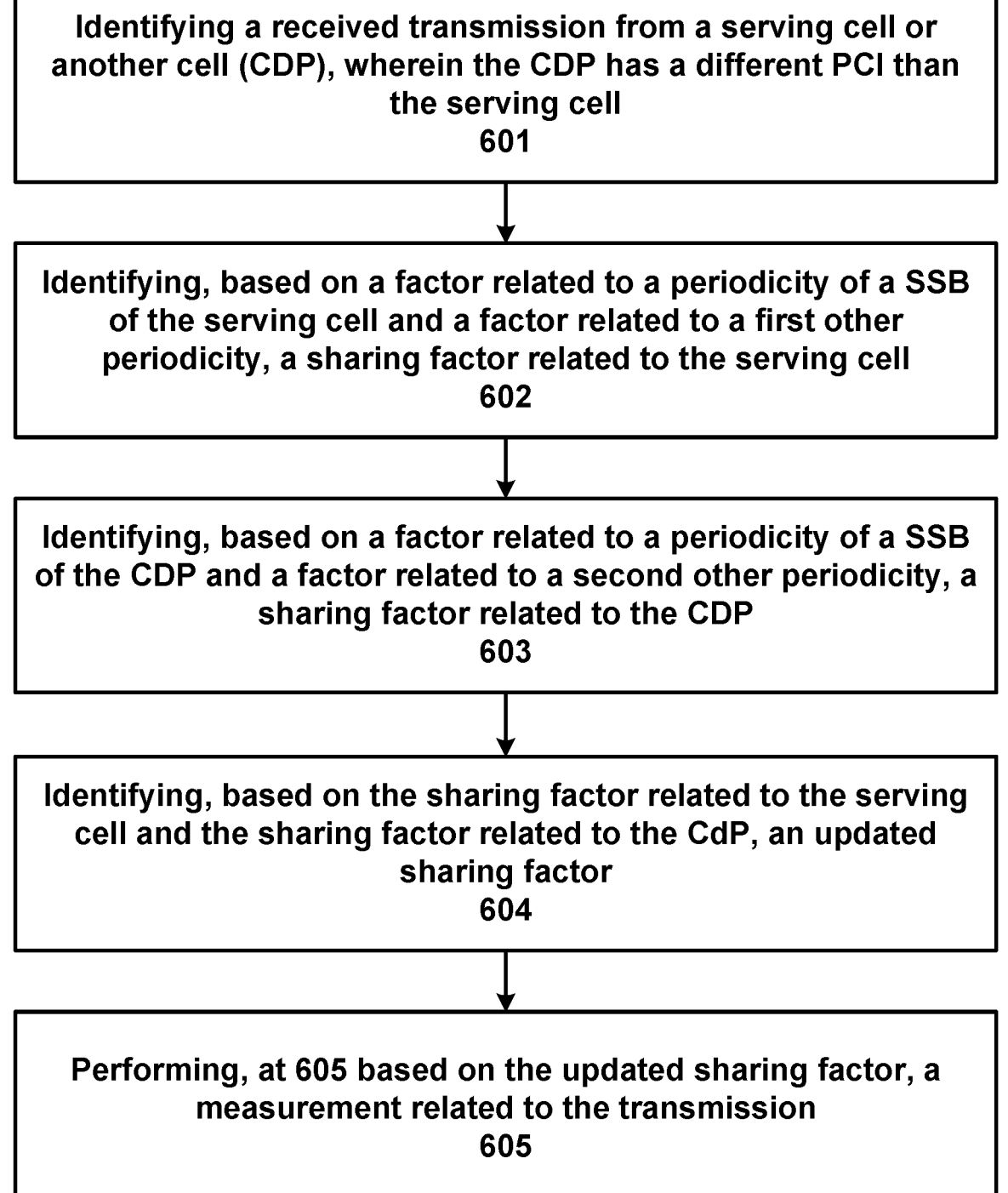
FIG. 6 depicts an example procedure for practicing the various embodiments discussed herein.

In some embodiments, the electronic device(s), network(s), system(s), chip(s) or component(s), or portions or implementations thereof, of FIGS. 2-5, or some other figure herein, may be configured to perform one or more processes, techniques, or methods as described herein, or portions thereof. One such process is depicted in FIG. 6. The process may include or relate to a method to be performed by a UE, one or more elements of a UE, and/or an electronic device that includes and/or implements the UE. The process may include identifying, at 601, a received transmission from a serving cell or another cell (CDP), wherein the CDP has a different physical cell identifier (PCI) than the serving cell; identifying, at 602 based on a factor related to a periodicity of a synchronization signal block (SSB) of the serving cell and a factor related to a first other periodicity, a sharing factor related to the serving cell; identifying, at 603 based on a factor related to a periodicity of a SSB of the CDP and a factor related to a second other periodicity, a sharing factor related to the CDP; identifying, at 604 based on the sharing factor related to the serving cell and the sharing factor related to the CDP, an updated sharing factor; and performing, at 605 based on the updated sharing factor, a measurement related to the transmission.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include the scaling factor will be calculated by two elements.

Example 2 may include for the first element, SSB resource for serving cell and cell with different PCI will be compared with legacy scenarios to calculate $P_{SC}$ and $P_{CDP}$ respectively.

Example 3 may include with the calculated $P_{SC}$ and $P_{CDP}$, the new periodicity for serving cell and cell with different PCI is derived as below:

$$T_{SSB\_SC}' = P_{SC} * T_{SSB\_SC}$$

$$T_{SSB\_CDP}' = P_{CDP} * T_{SSB\_CDP}$$

Example 4 may include that we can compare the periodicity to get the final scaling factor for serving cell and cell with different PCI under three conditions:

If $T_{SSB\_CDP}' < T_{SSB\_SC}'$ $$P_{final,CDP} = P_{CDP} * \frac{1}{1 - \frac{T_{SSB\_CDP}'}{T_{SSB\_SC}'}}$$

$$P_{final,\ SC} = P_{SC}$$

If $T_{SSB\_SC}' \leq T_{SSB\_CDP}'$ $$P_{final,\ CDP} = P_{CDP}$$

$$P_{final,SC} = P_{SC} * \frac{1}{1 - \frac{T_{SSB\_SC}'}{T_{SSB\_CDP}'}}$$

If $T_{SSB\_CDP}' = T_{SSB\_CDP}'$, the remaining part will be shared between serving cell and cell with different PCI.

$$P_{final,\ CDP} = P_{CDP} * 2$$

$$P_{final,\ SC} = P_{SC} * 2$$

Example 5 may include the final scaling factor will be applied to the L1-RSRP measurement period for serving cell and non-serving cell.

Example 6 may include a method to be performed by one or more electronic devices or elements thereof, wherein the method comprises:

identifying a serving cell scaling factor $P_{SC}$ related to layer 1-reference signal received power (L1-RSRP);

identifying a code domain power scaling factor $P_{CDP}$ related to L1-RSRP; and identifying, based on $P_{SC}$ and $P_{CDP}$, a periodicity related to a cell.

Example 7 may include the method of example 6, and/or some other example herein, wherein the cell is a new serving cell.

Example 8 may include the method of example 6, and/or some other example herein, wherein the cell is a cell with a different physical cell identifier (PCI).

Example 9 may include the method of any of examples 6-8, and/or some other example herein, wherein the one or more electronic devices include a user equipment (UE).

Example 10 may include the method of any of examples 6-9, and/or some other example herein, wherein $P_{SC}$ or $P_{CDP}$ are based on comparison with a legacy scenario.

Example 11 may include for FR1, UE can perform L1-RSRP for both serving cell and non-serving cell simultaneously when SSB resource for serving cell and non-serving cell are overlapped, no extra delay is needed.

Example 12 may include for FR2, inside SMTC, UE can perform L1-RSRP for both serving cell and non-serving cell simultaneously, no extra delay is needed.

Example 13 may include for FR2, outside SMTC, if SSB for serving cell and non-serving cell are fully overlapped and different RX beam is used, SSB for serving cell measurement and non-serving cell can only be shared, a sharing factor will be needed for measurement period.

Example 14 may include for FR2, outside SMTC, if SSB for serving cell and non-serving cell are partially overlapped and different RX beam is used, measurement restriction can be defined, e.g. UE is required to measure for serving cell or non-serving cell. It's not required to perform measurement simultaneously for two cells.

Example 15 may include for FR2, outside SMTC, if SSB for serving cell and non-serving cell are partially overlapped and different RX beam is used, some SSB will be used for serving cell and some others will be used for non-serving cell, a sharing factor will be needed for measurement period.

Example 16 may include for FR2, outside SMTC, SSB for serving cell and non-serving cell are fully or partially overlapped and same RX beam is used, UE can measure SSB for both cells simultaneously, no extra delay is needed.

Example 17 may include a method of a UE, the method comprising: determining that a first SSB resource of a serving cell overlaps with a second SSB resource of a non-serving cell; and performing L1-RSRP measurements on the respective first and second SSB resources simultaneously based on the determination.

Example 18 includes a method to be performed by a user equipment (UE), the method comprising: identifying a received transmission from a serving cell or another cell (CDP), wherein the CDP has a different physical cell identifier (PCI) than the serving cell; identifying, based on a factor related to a periodicity of a synchronization signal block (SSB) of the serving cell and a factor related to a first other periodicity, a sharing factor related to the serving cell; identifying, based on a factor related to a periodicity of a SSB of the CDP and a factor related to a second other periodicity, a sharing factor related to the CDP; identifying, based on the sharing factor related to the serving cell and the sharing factor related to the CDP, an updated sharing factor; and performing, based on the updated sharing factor, a measurement related to the transmission.

Example 19 includes the method of example 18, and/or some other example herein, wherein the first other periodicity or the second other periodicity is a periodicity of an SSB-based measurement timing configuration (SMTC).

Example 20 includes the method of example 19, and/or some other example herein, wherein the factor related to the periodicity of the SMTC is $T_{SMTC}$.

Example 21 includes the method of any of examples 18-20, and/or some other example herein, wherein the first other periodicity or the second other periodicity is a periodicity of a measurement gap (MG).

Example 22 includes the method of example 21, and/or some other example herein, wherein the factor related to the periodicity of the MG is xRP.

Example 23 includes the method of any of examples 18-22, and/or some other example herein, where the transmission is a frequency range 2 (FR2) transmission.

Example 24 includes the method of any of examples 18-23, and/or some other example herein, wherein the measurement is a layer 1 received signal reference power (L1-RSRP) measurement.

Example 25 includes the method of any of examples 18-24, and/or some other example herein, wherein the factor related to the periodicity of the serving cell is $T_{SSB}$.

Example 26 includes the method of any of examples 18-25, and/or some other example herein, wherein the factor related to the periodicity of the SSB of the CDP is $T_{CDP}$.

Example Z01 may include an apparatus comprising means to perform one or more elements of a method described in or related to any of examples 1-26, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example Z03 may include an apparatus comprising logic, modules, or circuitry to perform one or more elements of a method described in or related to any of examples 1-26, or any other method or process described herein.

Example Z04 may include a method, technique, or process as described in or related to any of examples 1-26, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-26, or portions thereof.

Example Z06 may include a signal as described in or related to any of examples 1-26, or portions or parts thereof.

Example Z07 may include a datagram, packet, frame, segment, protocol data unit (PDU), or message as described in or related to any of examples 1-26, or portions or parts thereof, or otherwise described in the present disclosure.

Example Z08 may include a signal encoded with data as described in or related to any of examples 1-26, or portions or parts thereof, or otherwise described in the present disclosure.

Example Z09 may include a signal encoded with a datagram, packet, frame, segment, protocol data unit (PDU), or message as described in or related to any of examples 1-26, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-26, or portions thereof.

Example Z11 may include a computer program comprising instructions, wherein execution of the program by a processing element is to cause the processing element to carry out the method, techniques, or process as described in or related to any of examples 1-26, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| 3GPP | Third Generation Partnership Project |
|------|------|
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |

-continued

| CA | Carrier Aggregation, Certification Authority |
|------|------|
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell- specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |

| | |
|---|---|
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |

| | |
|---|---|
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |

| | |
|---|---|
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non- Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |

| | |
|---|---|
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |

| | |
|---|---|
| PSDCH | Physical Sidelink Downlink Channel |
| PSCCH | Physical Sidelink Control Channel |
| PSSCH | Physical Sidelink Shared Channel |
| PSFCH | physical sidelink feedback channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH Block SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |

-continued

| | |
|---|---|
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastructure |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, VLAN Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "application" may refer to a complete and deployable package, environment to achieve a certain function in an operational environment. The term "AI/ML application" or the like may be an application that contains some AI/ML models and application-level descriptions.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), descision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML assisted solution using the output of the ML model inference). The term "ML training host" refers to an entity, such as a network function, that hosts the training of the model. The term "ML inference host" refers to an entity, such as a network function, that hosts model during inference mode (which includes both the model execution as well as any online learning if applicable). The ML-host informs the actor about the output of the ML algorithm, and the actor takes a decision for an action (an "action" is performed by an actor as a result of the output of an ML assisted solution). The term "model inference information" refers to information used as an input to the ML model for determining inference(s); the data used to train an ML model and the data used to determine inferences may overlap, however, "training data" and "inference data" refer to different concepts.

The invention claimed is:

1. An apparatus to be used in a user equipment (UE), wherein the apparatus comprises:
a memory to store:
first information related to a first synchronization signal block (SSB) received from a serving cell, wherein the first information includes a periodicity related to the first SSB and a sharing factor related to the first SSB; and
second information related to a second SSB received from a cell with a different physical cell identifier (CDP), wherein the second information includes a periodicity related to the second SSB and a sharing factor related to the second SSB; and
one or more processors configured to:
identify that the SSB received from the serving cell and the SSB received from the CDP at least partially overlap in time;
identify, based on the identification of overlap, an updated sharing factor based on the periodicity related to the first SSB, the sharing factor related to the first SSB, the periodicity related to the second SSB, and the sharing factor related to the second SSB; and
perform, based on the updated sharing factor, a measurement.

2. The apparatus of claim 1, wherein the measurement is a layer 1 reference signal received power (L1-RSRP) measurement.

3. The apparatus of claim 2, wherein the one or more processors are further configured to perform, based on an identification that (the periodicity related to the second SSB)*(the sharing factor related to the second SSB) is less than (the periodicity related to the first SSB)*(the sharing factor related to the first SSB), the L1-RSRP measurement based on the second SSB.

4. The apparatus of claim 2, wherein the one or more processors are further configured to perform, based on an identification that (the periodicity related to the first SSB)*

(the sharing factor related to the first SSB) is less than (the periodicity related to the second SSB)*(the sharing factor related to the second SSB), the L1-RSRP measurement based on the first SSB.

5. The apparatus of claim 1, wherein the periodicity related to the second SSB is $T_{SSB\_CDP}$.

6. The apparatus of claim 1, wherein the updated sharing factor is equal to (the periodicity related to the first SSB)/(1−((the periodicity related to the first SSB)*(the sharing factor related to the first SSB)/(the periodicity related to the second SSB)*(the sharing factor related to the second SSB)).

7. The apparatus of claim 1, wherein the updated sharing factor is equal to (periodicity related to the first SSB)/(1−((the periodicity related to the second SSB)*(the sharing factor related to the second SSB)/(the periodicity related to the first SSB)*(the sharing factor related to the first SSB)).

8. One or more non-transitory computer-readable media comprising instructions that, upon execution of the instructions by one or more processors of a user equipment (UE), are to cause the UE to:
identify first information related to a first synchronization signal block (SSB) received from a serving cell, wherein the first information includes a periodicity related to the first SSB and a sharing factor related to the first SSB;
identify second information related to a second SSB received from a cell with a different physical cell identifier (CDP), wherein the second information includes a periodicity related to the second SSB and a sharing factor related to the second SSB; and
identify that the SSB received from the serving cell and the SSB received from the CDP at least partially overlap in time;
identify, based on the identification of overlap, an updated sharing factor based on the periodicity related to the first SSB, the sharing factor related to the first SSB, the periodicity related to the second SSB, and the sharing factor related to the second SSB; and
perform, based on the updated sharing factor, a measurement.

9. The one or more non-transitory computer-readable media of claim 8, wherein the measurement is a layer 1 reference signal received power (L1-RSRP) measurement.

10. The one or more non-transitory computer-readable media of claim 9, wherein the instructions are further configured to cause the UE to perform, based on an identification that (the periodicity related to the second SSB)*(the sharing factor related to the second SSB) is less than (the periodicity related to the first SSB)*(the sharing factor related to the first SSB), the L1-RSRP measurement based on the second SSB.

11. The one or more non-transitory computer-readable media of claim 9, wherein the instructions are further to cause the UE to perform, based on an identification that (the periodicity related to the first SSB)*(the sharing factor related to the first SSB) is less than (the periodicity related to the second SSB)*(the sharing factor related to the second SSB), the L1-RSRP measurement based on the first SSB.

12. The one or more non-transitory computer-readable media of claim 8, wherein the periodicity related to the second SSB is $T_{SSB\_CDP}$.

13. The one or more non-transitory computer-readable media of claim 8, wherein the updated sharing factor is equal to (the periodicity related to the first SSB)/(1−((the periodicity related to the first SSB)*(the sharing factor related to the first SSB)/(the periodicity related to the second SSB)* (the sharing factor related to the second SSB)).

14. The one or more non-transitory computer-readable media of claim 8, wherein the updated sharing factor is equal to (periodicity related to the first SSB)/(1−((the periodicity related to the second SSB)*(the sharing factor related to the second SSB)/(the periodicity related to the first SSB)*(the sharing factor related to the first SSB)).

15. A user equipment (UE) comprising:

one or more processors; and one or more non-transitory computer-readable media comprising instructions that, upon execution of the instructions by the one or more processors of the UE, are to cause the UE to:

identify first information related to a first synchronization signal block (SSB) received from a serving cell, wherein the first information includes a periodicity related to the first SSB and a sharing factor related to the first SSB;

identify second information related to a second SSB received from a cell with a different physical cell identifier (CDP), wherein the second information includes a periodicity related to the second SSB and a sharing factor related to the second SSB; and identify that the SSB received from the serving cell and the SSB received from the CDP at least partially overlap in time;

identify, based on the identification of overlap, an updated sharing factor based on the periodicity related to the first SSB, the sharing factor related to the first SSB, the periodicity related to the second SSB, and the sharing factor related to the second SSB; and perform, based on the updated sharing factor, a measurement.

16. The UE of claim 15, wherein the measurement is a layer 1 reference signal received power (L1-RSRP) measurement.

17. The UE of claim 16, wherein the instructions are further configured to cause the UE to perform, based on an identification that (the periodicity related to the second SSB)*(the sharing factor related to the second SSB) is less than (the periodicity related to the first SSB)*(the sharing factor related to the first SSB), the L1-RSRP measurement based on the second SSB.

18. The UE of claim 16, wherein the instructions are further to cause the UE to perform, based on an identification that (the periodicity related to the first SSB)*(the sharing factor related to the first SSB) is less than (the periodicity related to the second SSB)*(the sharing factor related to the second SSB), the L1-RSRP measurement based on the first SSB.

19. The UE of claim 15, wherein the updated sharing factor is equal to (the periodicity related to the first SSB)/ (1−((the periodicity related to the first SSB)*(the sharing factor related to the first SSB)/(the periodicity related to the second SSB)*(the sharing factor related to the second SSB)).

20. The UE of claim 15, wherein the updated sharing factor is equal to (periodicity related to the first SSB)/(1− ((the periodicity related to the second SSB)*(the sharing factor related to the second SSB)/(the periodicity related to the first SSB)*(the sharing factor related to the first SSB).

* * * * *